United States Patent [19]

Danjushevskaya et al.

[11] 4,207,301
[45] Jun. 10, 1980

[54] PROCESS FOR PRODUCING ZINC PHOSPHATE

[76] Inventors: Natalia E. Danjushevskaya, ulitsa Dibunovskaya, 63, kv. 32; Olga V. Alexeeva, Menshikovsky prospekt, 3, kv. 47; Bella G. Pogostkina, prospekt Ispytatelei, 11/1, kv. 412; Valentina M. Kovalenko, ulitsa Bukharestskaya, 94, korpus 1, kv. 306; Zinaida A. Mironova, Liqovsky prospekt, 3/9, kv. 25, all of Leningrad, U.S.S.R.

[21] Appl. No.: 19,151

[22] Filed: Mar. 9, 1979

[30] Foreign Application Priority Data

Mar. 14, 1978 [SU] U.S.S.R. .............................. 2589500

[51] Int. Cl.$^2$ .............................................. C01B 25/37
[52] U.S. Cl. ...................... 423/305; 423/309; 423/311
[58] Field of Search .................. 423/305, 309, 311

[56] References Cited

U.S. PATENT DOCUMENTS

| | | | |
|---|---|---|---|
| 1,926,266 | 9/1933 | Darsey | 423/309 |
| 2,230,980 | 2/1941 | Ruthruff | 423/305 |

FOREIGN PATENT DOCUMENTS

| | | | |
|---|---|---|---|
| 0682636 | 3/1964 | Canada | 423/309 |
| 0270820 | 5/1927 | United Kingdom | 423/309 |
| 0962182 | 7/1964 | United Kingdom | 423/311 |
| 0352833 | 11/1972 | U.S.S.R. | 423/305 |

*Primary Examiner*—John H. Mack
*Assistant Examiner*—Wayne A. Langel
*Attorney, Agent, or Firm*—Lackenbach, Lilling & Siegel

[57] ABSTRACT

A process for producing zinc phosphate comprising treatment of zinc oxide with phosphoric acid in an aqueous medium at a temperature ranging from 70° to 80° in the presence of metallic zinc taken in an amount of from 1 to 10% by weight of zinc oxide, followed by separation of the resulting residue of zinc phosphate. It is possible to introduce zinc oxide and metallic zinc into the treatment process in a composition of zinc-containing wastes resulting from the production of formaldehyde sodium sulphoxylate or sodium hydrosulphite, or 2,2-hydroxy-5-methylphenylbenzotriazole. The yield of zinc phosphate is as high as 98%. The process of this invention makes it possible to produce zinc phosphate ensuring high protective and physico-mechanical properties of paint coatings based on synthetic binders. Thus, no signs of corrosion are observed on the coating based on epoxy resin and zinc phosphate produced by the process of this invention after tests for 6 months at temperatures of 20° and 60° C. in a 3% aqueous solution of sodium chloride. Adhesion of the coating to a metal surface as determined by the normal tearing-off method is 75–80 kg/cm$^2$. The coating impact strength is as high as 35 kgf.cm and bending strength is 10 mm. Adhesion of a paint coating based on glyphthalic resin and zinc phosphate produced by the process of this invention to a metal surface is 80 kg/cm$^2$. Impact strength of this coating is as high as 50 kgf.cm and bending strength is 1 mm.

3 Claims, No Drawings

PROCESS FOR PRODUCING ZINC PHOSPHATE

FIELD OF THE INVENTION

The present invention relates to processes for producing zinc phosphate. Zinc phosphate is employed as a non-toxic and effective corrosion-resistant pigment incorporated in paint-varnish coatings based on synthetic binders for protection of metals. Furthermore, zinc phosphate is employed as a filler in the manufacture of vulcanizates for the purpose of increasing heat-resistance and lowering corrosion activity thereof.

BACKGROUND OF THE INVENTION

Known in the art is a process for producing zinc phosphate by way of treating zinc sulphate with a solution of phosphoric acid in the presence of an alkali (cf. French Pat. No. 812,002).

This prior art process has a disadvantage residing in that along with the formation of one ton of zinc phosphate there is formed one ton of sodium sulphate which is a waste product and finds no commercial application. Furthermore, paint coatings including zinc phosphate produced by this process have insufficient protective properties. Thus, the surface of a paint coating based on epoxy resin containing said zinc phosphate is damaged as much as 50% by blistering after residence of the coating for 6 months in a 3% aqueous solution of sodium chloride at a temperature of 20° C. Physico-mechanical properties of the coating are also insufficient (thus, the impact strength of the coating is equal to 15 kgf.cm).

Also known in the art is a process for producing zinc phosphate by treating zinc oxide with a solution of phosphoric acid at the boiling point of the solution (121° C.), followed by cooling of the solution and separation of a crystalline product (cf. G. Brower "Guidebook on Preparative Inorganic Chemistry", 1956, p. 497).

The yield of zinc phosphate in this process is low and constitutes about 20%. Furthermore, paint-varnish coatings incorporating zinc phosphate produced by the above-mentioned process have insufficient protective properties. Thus, the surface of a paint coating based on epoxy resin containing said zinc phosphate after exposure of the coating for 6 months to a 3% aqueous solution of sodium chloride at a temperature of 20° C. is damaged by 20% with blistering corrosion. Moreover, the coatings have low physico-mechanical properties. (Thus, impact strength of the coating is 20-25 kgf/cm).

BRIEF SUMMARY OF THE INVENTION

It is an object of the present invention to provide a process which makes it possible to increase the yield of zinc phosphate and obtain high protective and physico-mechanical properties of paint-varnish coatings incorporating same.

This and other objects of the present invention are accomplished by a process for producing zinc phosphate by way of treatment of zinc oxide with phosphoric acid in an aqueous medium upon heating, followed by separation of the resulting zinc phosphate. When accordance with the present invention the treatment is carried out at a temperature of from 70° to 80° C. in the presence of metallic zinc taken in an amount of from 1 to 10% by weight of zinc oxide.

It is advisable that zinc oxide and metallic zinc be introduced into the treatment process in a formulation with zinc-containing waste products resulting from the manufacture of sodium formaldehyde sulphoxylate or sodium hydrosulphite, or 2,2-hydroxy-5-methylphenyl-benzotriazole; said treatment being conducted in the presence of an oxidizing agent taken in an amount within the range of from 5 to 15% by weight of the zinc-containing waste products.

The oxidizing agent is employed to oxidize the impurities present in zinc-containing waste products and convert them to the water-soluble state.

It is advisable to use hydrogen peroxide, potassium permanganate or potassium bromide as the oxidizing agent.

The process according to the present invention is characterized by such specific features as performing the reaction in the presence of metallic zinc taken in specified amounts under specified conditions, as well as the use of zinc-containing waste products and the presence of an oxidizing agent in a specified amount.

It is inadvisable to carry out the process at a temperature below 70° C., since this results in a lowered yield of the product. A process temperature exceeding 80° C. does not provide any improvement in the process technology.

The use of metallic zinc in an amount below 1% by weight of zinc oxide imparts no positive properties to a coating based on zinc phosphate. The use of metallic zinc in an amount above 10% by weight of zinc oxide is inexpedient, since this results in an incomplete reaction with phosphoric acid.

The process according to the present invention makes it possible to increase the yield of zinc phosphate up to 98%. Furthermore, the process enables the production of zinc phosphate ensuring high protective and physico-mechanical properties of paint-varnish coatings based on synthetic binders. Thus, no signs of corrosion are observed on a paint coating based on epoxy resin and zinc phosphate produced by the process according to the present invention after 6 months of tests in a 3% aqueous solution of sodium chloride at a temperature of 20° and 60° C. respectively. Adhesion of the coating to the metal surface as determined by the normal tearing-off method is 74–80 kg/cm$^2$. The impact strength of the coating is as high as 35 kgf.cm and its bending strength is equal to 10 mm. The paint coating based on gyphthalic resin and zinc phosphate produced by the process according to the present invention has a high adhesion to the metal surface (80 kg/cm$^2$). The impact strength of this coating is as high as 50 kgf.cm, while its bending strength is equal to 1 mm.

DETAILED DESCRIPTION OF THE INVENTION

The process for producing zinc phosphate according to the present invention is performed in the following manner.

Zinc oxide and metallic zinc or zinc-containing waste products resulting from the above-mentioned manufacturing processes including zinc oxide and metallic zinc are ground by wet grinding in a ball mill in the presence of an oxidizing agent (the oxidizing agent is used in the case of employing zinc-containing production wastes). As the oxidizing agent use can be made of hydrogen peroxide, potassium permanganate, potassium bromide, oxygen, ozone, and the like. The remaining amount of water is then added to the ground zinc-containing material, heated to a temperature of from 70° to 80° C. and under continuous stirring an aqueous solution of phosphoric acid is gradually added thereto. The suspension is maintained at the above-mentioned temperature for 30 to 60 minutes longer, whereafter the resulting zinc phosphate is filtered-off, washed and dried. The product yield is 95–98%.

For a better understanding of the present invention, some specific examples are given hereinbelow by way of illustration of the process for producing zinc phosphate.

EXAMPLE 1

In a ball mill 438 g of zinc oxide and 4 g of metallic zinc (powder) are ground by the wet grinding method in the presence of 500 g of water, whereafter an additional 1,000 g of water are added thereto. The resulting slurry is heated to a temperature of 70° C. and under continuous stirring 350 g of phosphoric acid are added thereto (as calculated for 100% $H_3PO_4$). After 40 minutes the slurry is filtered, the residue is washed and dried to give 700 g of zinc phosphate (the yield is 98%).

Paint coatings based on synthetic binders containing zinc phosphate produced as in Example 1 have high protective and physico-mechanical properties. Thus, no signs of corrosion are observed on the surface of a paint coating based on epoxy resin and zinc phosphate produced as in Example 1 after 6 months of tests of the coating in a 3% aqueous solution of sodium chloride at a temperature of 20° C. Adhesion of this coating to a metal surface as determined by the normal tearing-off method is 75 kg/cm$^2$. The impact strength of the coating is equal to 30 kgf.cm and bending strength is 15 mm. A paint coating based on glyphthalic resin and zinc phosphate produced as in this Example has the adhesion to an metallic surface of 80 kg/cm$^2$. The impact strength of the coating is 50 kfg.cm and bending strength is 1 mm.

EXAMPLE 2

Production of zinc phosphate is performed following the procedure of the foregoing Example 1. The only difference is that zinc oxide is used in the amount of 416 g, and metallic zinc (powder) is used in the amount of 17.5 g and the slurry is heated to a temperature of 80° C.

The test results for the paint coatings based on epoxy and glyphthalic resins and zinc phosphate produced in this Example are similar to the test results obtained in Example 1 hereinabove.

EXAMPLE 3

Production of zinc phosphate is performed following the procedure described in Example 1 hereinbefore. The difference is that zinc oxide is used in the amount of 394 g, metallic zinc (powder) in the amount of 35 g and the slurry is heated to a temperature of 75° C.

The test results obtained for the paint coatings based on epoxy and glyphthalic resins and zinc phosphate produced in this Example are similar to those given in Example 1.

EXAMPLE 4

Zinc-containing wastes resulting from the production of sodium formaldehydesulphoxylate (rongalite) in the amount of 440 g containing 405 g of zinc oxide and 21 g of metallic zinc are ground in a ball mill by the wet grinding method in the presence of 500 g of water, whereafter additional 1,000 g of water are added thereto along with a 30% aqueous solution of hydrogen peroxide in the amount of 71 g. Under continuous stirring the suspension is heated to a temperature of 70° C., whereafter 342 g of phosphoric acid as calculated for 100% $H_3PO_4$ are added thereto. After 30 minutes the suspension is filtered, the residue is washed and dried. There are obtained 700 g of zinc phosphate (the yield is equal to 98%).

Paint-varnish coatings produced from synthetic binders containing zinc phosphate as obtained in Example 4 have high protective and physico-mechanical properties. Thus, no signs of corrosion are observed on the surface of a paint coating based on epoxy resin and said zinc phosphate after 6 months of tests of the coating in a 3% aqueous solution of sodium chloride at temperatures of 20° and 60° C. Adhesion of this coating to a metallic surface as determined by the method of normal tearing-off is 80 kg/cm$^2$. The impact strength of the coating is equal to 35 kgf.cm and bending strength is 10 mm. A paint coating based on glyphthalic resin and zinc phosphate as obtained in this Example has an adherence to a metal surface of 80 kg/cm$^2$. The impact strength of this coating is 50 kgf.cm and bending strength is 1 mm.

EXAMPLE 5

Zinc-containing wastes resulting from the production of sodium hydrosulphite in the amount of 1,019 g containing 960 g of zinc oxide and 10 g of metallic zinc are ground in a ball mill by the wet grinding method in the presence of 1,000 g of water, whereafter an additional 2,000 g of water are added thereto along with 143 g of potassium permanganate. Under continuous stirring, the slurry is heated to a temperature of 80° C. and 965 g of phosphoric acid as calculated for 100% $H_3PO_4$ are added thereto. The slurry is subjected to filtration after 35 minutes of the heating, the residue is washed and dried to give 2 kg of zinc phosphate (the yield is equal to 97%).

Protective properties, as well as physico-mechanical characteristics of the resulting paint coatings based on epoxy and glyphtahalic resins and zinc phosphate produced as in Example 5 are similar to those of coatings produced as in Example 4 hereinabove.

EXAMPLE 6

Zinc-containing wastes resulting from the production of 2,2-hydroxy-5-methylphenylbenzotriazole in the amount of 725 g containing 625 g of zinc oxide and 65 g of metallic zinc are ground in a ball mill by the wet grinding method in the presence of 700 g of water, whereafter an additional 1,500 g of water and 86 g of potassium bromide are added to the ground mixture. Under continuous stirring the suspension is heated to a temperature of 80° C. and 687 g of phosphoric acid are added as calculated for 100% $H_3PO_4$. After 30 minutes the suspension is filtered, the residue is washed and dried to give 1.2 kg of zinc phosphate (the yield is 95%).

Protective and physico-mechanical properties of paint coatings based on epoxy and glyphthalic resins and zinc phosphate produced as in this Example 6 are similar to those of coatings obtained in Example 4 hereinbefore.

What is claimed is:

1. A process for producing zinc phosphate comprising treating zinc oxide with phosphoric acid in an aqueous medium at a temperature ranging from 70° to 80° C. in the presence of metallic zinc taken in an amount of from 1 to 10% by weight of zinc oxide, followed by separation of the resulting residue of zinc phosphate.

2. A process as claimed in claim 1, wherein zinc oxide and metallic zinc are introduced into the process of treatment in a composition of zinc-containing wastes resulting from the production of a compound selected from the group consisting of formaldehyde sodium sulphoxylate, sodium hydrosulphite and 2,2-hydroxy-5-methylphenylbenzotriazole and said treatment is conducted in the presence of an oxidizing agent taken in an amount ranging from 5 to 15% by weight of the zinc-containing wastes.

3. A process as claimed in claim 2, wherein as the oxidizing agent use is made of a compound selected from the group consisting of hydrogen peroxide, potassium permanganate and potassium bromide.

* * * * *